(12) United States Patent
Wagner et al.

(10) Patent No.: US 9,687,768 B2
(45) Date of Patent: Jun. 27, 2017

(54) FILTER DEVICE

(71) Applicant: MANN+HUMMEL GMBH, Ludwigsburg (DE)

(72) Inventors: Fabian Wagner, Moeglingen (DE); Robert Hasenfratz, Waiblingen (DE); André Roesgen, Remshalden (DE); Christian Thalmann, Speyer (DE); Frank Pflueger, Sachsenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/704,003

(22) Filed: May 5, 2015

(65) Prior Publication Data

US 2015/0337778 A1 Nov. 26, 2015

(30) Foreign Application Priority Data

May 5, 2014 (DE) ........................ 10 2014 006 396

(51) Int. Cl.
| | |
|---|---|
| *B01D 46/00* | (2006.01) |
| *F02M 17/04* | (2006.01) |
| *F02M 35/04* | (2006.01) |
| *B01D 46/10* | (2006.01) |
| *F01N 3/30* | (2006.01) |
| *F02M 35/024* | (2006.01) |
| *B01D 46/52* | (2006.01) |
| *F02M 35/02* | (2006.01) |

(52) U.S. Cl.
CPC ......... *B01D 46/10* (2013.01); *B01D 46/0002* (2013.01); *B01D 46/0047* (2013.01); *B01D 46/521* (2013.01); *F01N 3/303* (2013.01); *F02M 35/024* (2013.01); *F02M 35/0204* (2013.01); *F02M 35/02491* (2013.01)

(58) Field of Classification Search
CPC ........ B01D 46/00; F02M 17/04; F02M 35/04; F02M 35/10019; F02M 35/10196; F05C 2225/08; Y10S 55/28
USPC .... 123/198 E; 55/385.3, 417, 490, 502, 418, 55/497, 312, 313, 419, DIG. 28
See application file for complete search history.

(56) References Cited

U.S. PATENT DOCUMENTS

| | | | | |
|---|---|---|---|---|
| 7,393,372 B2 * | 7/2008 | Cassell | ................ | F02M 35/024 123/198 E |
| 8,002,863 B2 * | 8/2011 | Kubo | ................... | F02M 35/024 123/198 E |

(Continued)

FOREIGN PATENT DOCUMENTS

| | | |
|---|---|---|
| DE | 19941303 A1 | 3/2001 |
| DE | 102004002293 A1 | 7/2005 |

*Primary Examiner* — Jacob T Minskey
*Assistant Examiner* — Minh-Chau Pham
(74) *Attorney, Agent, or Firm* — James Hasselbeck

(57) ABSTRACT

A filter device has a filter housing and a plate-shaped filter element that is arranged in the filter housing. The filter element has oppositely positioned lateral surfaces that form an inflow side for a fluid to be filtered and an outflow side for the clean fluid. A first clean fluid outflow opening is introduced into the filter housing for discharging the clean fluid. An outflow pipe passes through the filter element for discharging the clean fluid through a second clean fluid outflow opening provided at the outflow pipe. The first clean fluid outflow opening is arranged at a spacing relative to the outflow pipe.

15 Claims, 4 Drawing Sheets

(56) References Cited

U.S. PATENT DOCUMENTS

| | | | |
|---|---|---|---|
| 2001/0005984 A1* | 7/2001 | Knodler | F02M 17/04 55/385.3 |
| 2001/0005985 A1* | 7/2001 | Schueler | B01D 29/114 55/385.3 |
| 2002/0166311 A1* | 11/2002 | Maricq | F16D 65/0031 55/385.3 |
| 2003/0029145 A1* | 2/2003 | Sudoh | B01D 46/0004 55/418 |
| 2005/0247034 A1* | 11/2005 | Canova | F02M 35/024 55/385.3 |
| 2007/0144154 A1 | 6/2007 | Keller | |

* cited by examiner

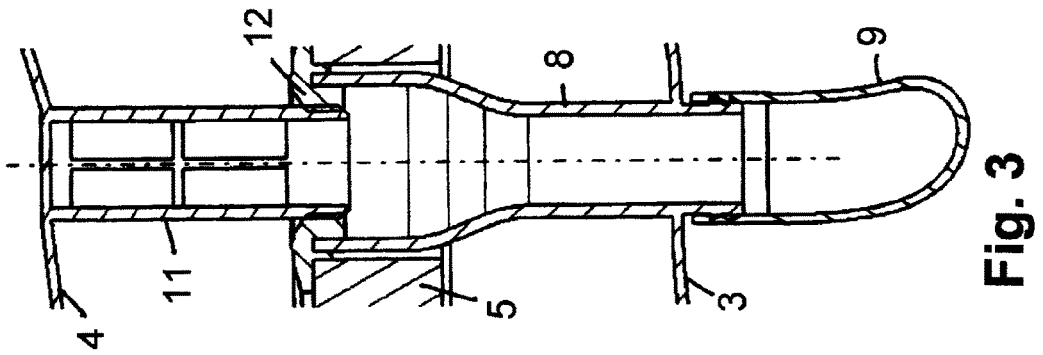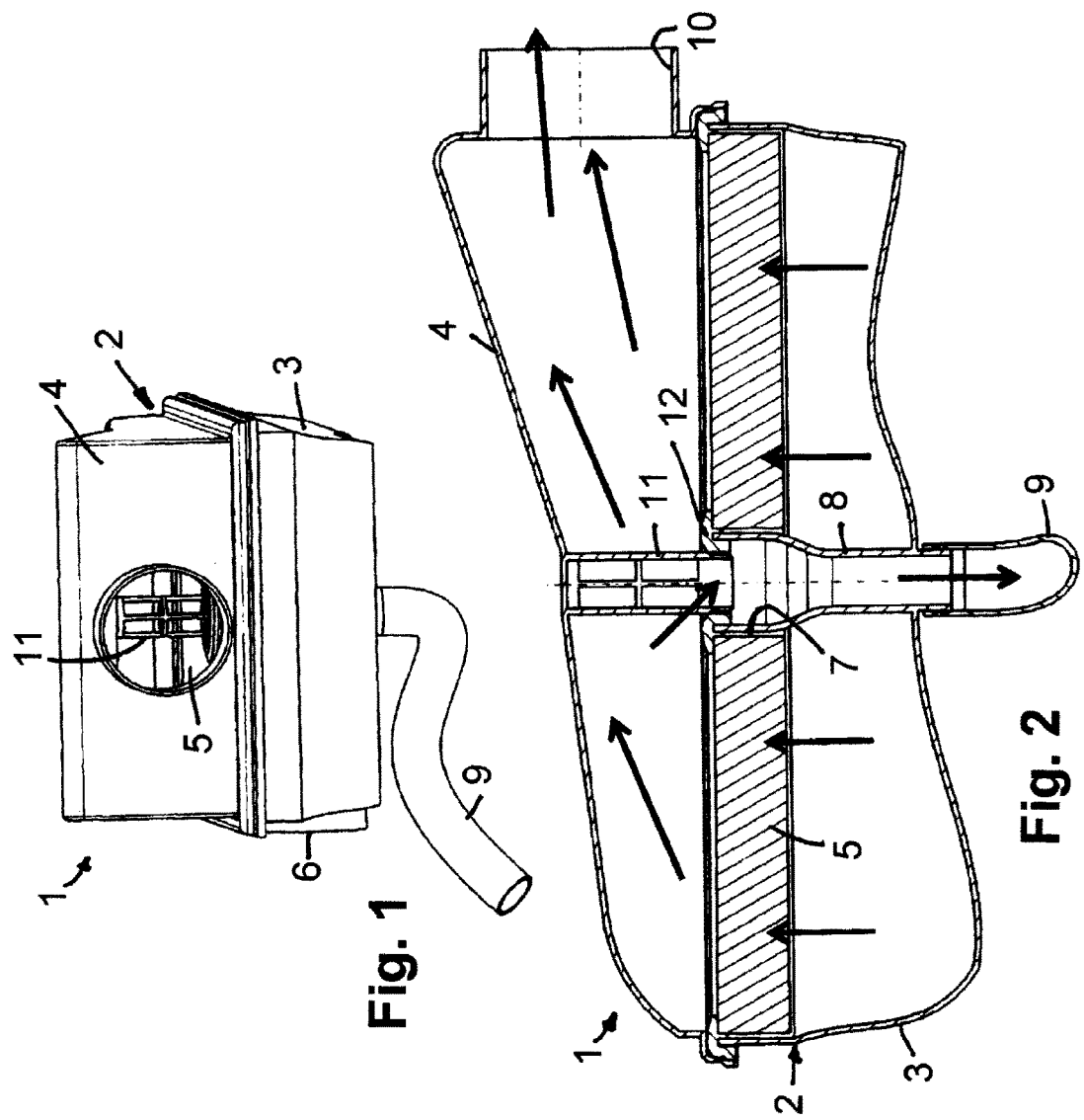

FILTER DEVICE

BACKGROUND OF THE INVENTION

The invention concerns a filter device, in particular a gas filter such as, for example, an air filter for an internal combustion engine, comprising a filter element that is plate-shaped and received in a filter housing. The oppositely positioned lateral surfaces of the filter element form the inflow side and the outflow side. An outflow pipe passes through the filter element for discharging the purified (clean) fluid.

DE 199 41 303 A1 discloses an air filter for an internal combustion engine comprising a plate-shaped filter element in a housing which is flowed through by the air transverse to the filter element plane. The filter element is received in a filter housing into which the unpurified air is guided by means of a lateral socket to the raw side of the filter element. The filter element has a central opening into which an outflow pipe projects by means of which the purified air is discharged from the filter housing.

SUMMARY OF THE INVENTION

It is the object of the invention to provide with simple measures a compact and versatile filter device.

This object is solved according to the invention in that a first clean fluid outflow opening for discharging the purified (clean) fluid is introduced into the filter housing at a spacing relative to the outflow pipe and the outflow pipe has a second clean fluid outflow opening for discharging purified (clean) fluid.

The dependent claims provide expedient further embodiments.

The filter device according to the invention can be used for filtration of gaseous or liquid fluids, for example, as an air filter for an internal combustion engine. The filter device comprises a plate-shaped filter element that, transverse to its filter element plane, is flowed through by the fluid to be purified; the oppositely positioned lateral surfaces of the filter element form the inflow side at the raw side and the outflow side at the clean side. The plate-shaped or parallel-epipedal filter element can be designed as a folded filter with a fold-shaped filter medium body or a filter medium body of a compact configuration. The filter element is received in a filter housing into which the raw fluid is introduced and from which the clean fluid is discharged for further use.

The filter element comprises an opening through which an outflow pipe for discharging the purified fluid extends The unpurified fluid after introduction into the filter housing is guided to the raw side of the filter element, passes through the filter element, and is subsequently discharged from the clean side by means of the outflow pipe through the opening in the filter element out of the filter housing.

In particular, the opening can be formed by a through opening, a hole or a cutout in the filter medium of the filter element. Especially, the fluid can flow through the opening of the filter element without having to flow (again) through the filter medium itself.

In addition to the discharge via the outflow pipe extending through the filter element, a first housing-associated clean fluid outflow opening is introduced into the filter housing at a spacing relative to the outflow pipe. There is thus the possibility to discharge the clean fluid alternatively or additionally via the housing-associated clean fluid outflow opening. Accordingly, there is the possibility to discharge a portion of the fluid flow via the clean fluid outflow opening of the outflow pipe and a further portion of the fluid flow via the housing-associated clean fluid outflow opening from the filter housing. Inasmuch as the filter device is provided with controllable actuators, for example, regulating flaps, the fluid flow from the clean side of the filter element can be discharged selectively via the outflow pipe or the housing-associated clean fluid outflow opening or, according to a further advantageous embodiment, the quantity of the partial fluid flows through the outflow pipe and the clean fluid outflow opening can be adjusted. The second clean fluid outflow opening of the outflow pipe is formed, for example, by the opening at the end face of the outflow pipe.

The housing-associated clean fluid outflow opening which is separately embodied from the outflow pipe in the wall of the filter housing makes it possible to supply the fluid flow discharged therethrough to a different intended use than the fluid flow discharged via the outflow pipe. By means of the housing-associated clean fluid outflow opening, for example, discharge of primary air is realized and, via the clean fluid outflow opening of the outflow pipe, discharge of secondary air which can be supplied to an auxiliary device. For example, it is possible to supply a first partial flow (primary air) to the internal combustion engine and a second partial flow (secondary air) to the vehicle cabin.

Various embodiments are conceivable in regard to where on the filter housing the housing-associated clean fluid outflow opening is to be arranged. According to a preferred embodiment, the housing-associated clean fluid outflow opening is provided in a clean chamber in the filter housing which is facing immediately the outflow side of the filter element. Accordingly, the purified fluid can be discharged immediately and with minimal flow resistance from the clean chamber. It can be expedient to discharge the greater fluid flow proportion through the housing-associated clean fluid outflow opening and the smaller fluid flow proportion through the outflow pipe. For this purpose, the housing-associated clean fluid outflow opening advantageously has a greater cross-sectional area than the outflow pipe.

Advantageously, the filter element is provided with an opening through which the outflow pipe is guided. According to an alternative embodiment, the outflow pipe is arranged laterally on the filter element and is guided past the filter element or passed through a laterally half-open recess in the filter element. The outflow pipe communicates with its one end with the clean chamber in the filter housing and opens with its opposite end in an outflow opening through which the purified fluid is discharged from the clean chamber.

According to a further expedient embodiment, into the opening in the filter element through which the outflow pipe is guided a sealing element is inserted on which the outflow pipe is resting. Advantageously, on a housing component a support part is arranged that is supported on the filter element, preferably on the sealing element which is inserted into the opening in the filter element. The housing component is, for example, a cover of the filter housing which can be attached to the housing base member of the filter housing. The support part that is embodied, for example, as a support grid is either monolithically embodied with the housing component, in particular as an injection-molded part, or as a separate component which is connected with the housing component. The support part imparts additional stability to the connected housing component. Flow openings are introduced into the support part by means of which the clean fluid passes into the outflow pipe.

The support part can project either into the annular sealing element wherein in this case a support action is provided in radial direction and, as a result of friction, also in axial direction of the support part. Possible is also that the support part with its end face is supported on the sealing element; in this case, the support action is axial.

The outflow pipe can optionally be embodied monolithically with the housing component, in particular with the housing base member. The housing components are preferably injection-molded plastic components. An end face of the outflow pipe projects advantageously as a socket out of the housing and can be used for connecting a hose or pipe thereto.

The invention concerns moreover a filter element for a filter device, preferably a gas filter, for example an air filter, wherein the filter element is embodied plate-shaped or parallelepipedal and preferably is provided with an opening through which an outflow pipe can be guided. The filter element is part of the afore described filter device.

BRIEF DESCRIPTION OF THE DRAWINGS

Further advantages and expedient embodiments can be taken from the further claims, the figure description, and the drawings.

FIG. 1 shows in perspective illustration an air filter for an internal combustion engine.

FIG. 2 shows the air filter according to FIG. 1 in a section illustration.

FIG. 3 shows an outflow pipe inserted into an opening in the filter element in an enlarged illustration.

In the Figures, same components are provided with same reference characters.

DESCRIPTION OF PREFERRED EMBODIMENTS

Figure 4:
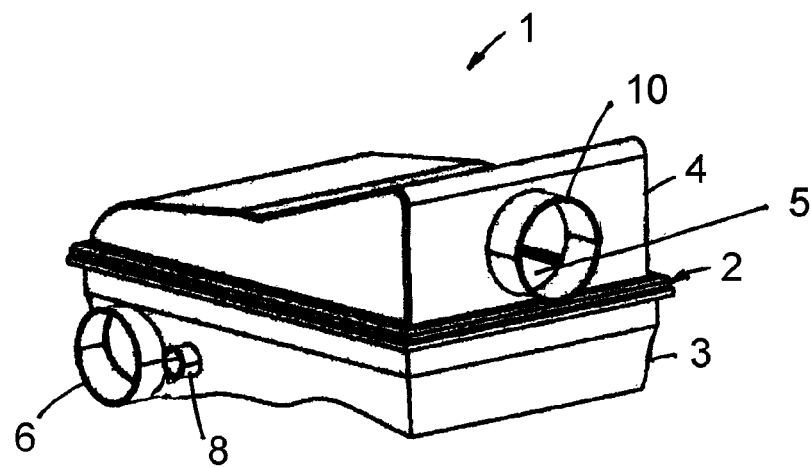
FIG. 4 shows an air filter in a further embodiment in a perspective illustration.

In FIGS. 1 to 3, a first embodiment of an air filter for an internal combustion engine is illustrated. The filter device 1 embodied as an air filter comprises a filter housing 2 with a housing base member 3 and a cover 4 placed thereon; the housing base member 3 and the cover 4 form housing components. Into the filter housing 2, a plate-shaped or parallelepipedal filter element 5 is inserted that is embodied, for example, as a folded filter or is comprised of a compact filter medium body. The flow through the filter element 5 with the fluid to be cleaned is realized, as indicated in the illustration according to FIG. 2 by the flow arrows, transverse to the plane of the filter element. The area in the filter housing 2 which is facing the inflow side of the filter element 5 forms in this context the raw chamber, the area that is facing the outflow side the clean chamber. The raw fluid is supplied via an inflow opening 6 in the housing base member 3 into the raw chamber. The raw chamber is located within the housing base member 3, the clean chamber is covered by the cover 4.

The discharge of the purified fluid from the clean chamber in the filter housing 2 is realized along two paths with a respective partial flow. On the one hand, the filter element 5 is provided with a central opening 7 into which an outflow pipe 8 projects. From the clean chamber, the purified fluid can be discharged via the outflow pipe 8 projecting into the opening 7 out of the filter housing 2 to the exterior. A hose 9 is connected, for example, to the free end face of the outflow pipe 8. The outflow pipe 8 is monolithically formed with the housing base member 3, the free end face of the outflow pipe 8 projects like a socket past the outer wall of the housing base member 3 and forms a clean fluid outflow opening.

On the other hand, in the cover 4 a housing-associated clean fluid outflow opening 10 is introduced by means of which a further partial flow of the purified fluid can be discharged from the clean chamber. The housing-associated clean fluid outflow opening 10 is also embodied like a socket and is located laterally on the cover 4 so that the partial flow that is guided through the housing-associated clean fluid outflow opening 10 is discharged radially from the filter device 1 relative to the longitudinal axis of the outflow pipe 8. The housing-associated clean fluid outflow opening 10 has a greater cross-sectional area than the outflow pipe 8 which, in combination with the arrangement of the opening 10 in the wall of the cover 4, has the result that by means of the housing-associated clean fluid outflow opening 10 a greater partial fluid flow is discharged than via the outflow pipe 8.

At the inner side of the cover 4 there is a support part 11 in the form of a cylindrical support grid which is formed monolithically with the cover 4. The support part 11 is arranged coaxially to the outflow pipe 8 and is positioned in the clean chamber in the filter housing 2. The support part 11 projects with its free end face into the outflow pipe 8. Into the opening 7 in the filter element 5 an annular sealing element 12 is inserted that is facing the clean chamber and into which the area of the end face of the support part 11 projects. In this way, the support part 11 as well as the cover 4 experience an additional support action in radial direction. The support part 11 projects with friction into the sealing element 12 so that an axial support action is provided also.

The end face of the outflow pipe 8 contacts the sealing element 12 and projects in particular into a circumferential groove that is introduced into the sealing element 12. The support pipe 8 has sections with differently sized diameters, the section of the support pipe 8 that is projecting into the opening 7 in the filter element 5 has a widened diameter which is greater than the diameter of the support part 11 so that the end face portion of the support part 11 which is projecting into the opening 7 is surrounded by the outflow pipe 8. The sealing element 12 experiences an axial support action by means of the outflow pipe 8 which is resting with its end face on the sealing element 12.

In the first embodiment according to FIGS. 1 to 3, the outflow pipe 8 is extended to the bottom side of the housing base member 3 so that the partial fluid flow that is guided through the outflow pipe 8 is discharged in downward direction.

Figure 5:
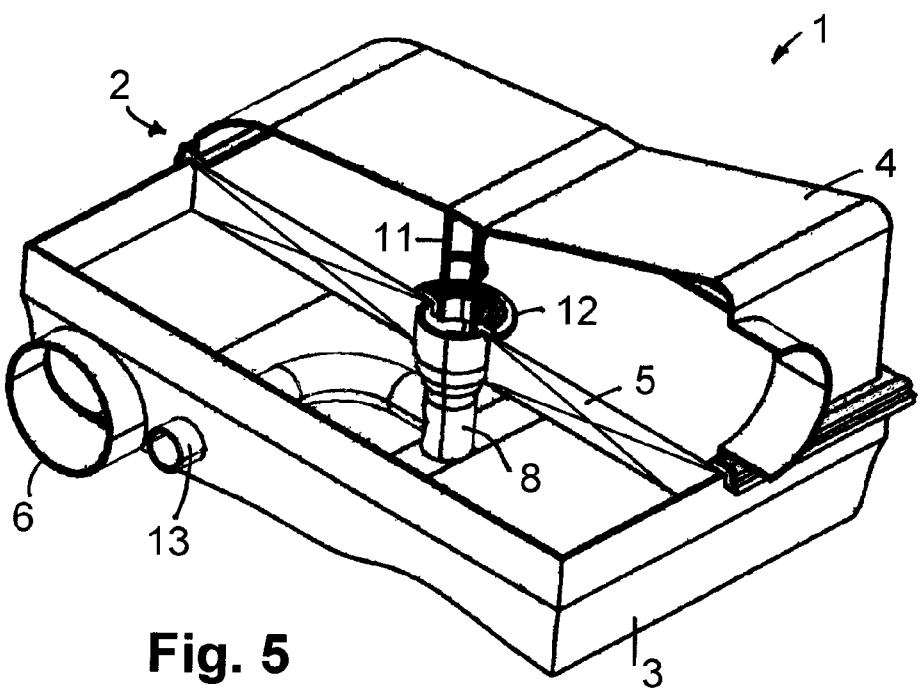
FIG. 5 shows the air filter according to FIG. 4 in a partially sectioned illustration.
Figure 6:
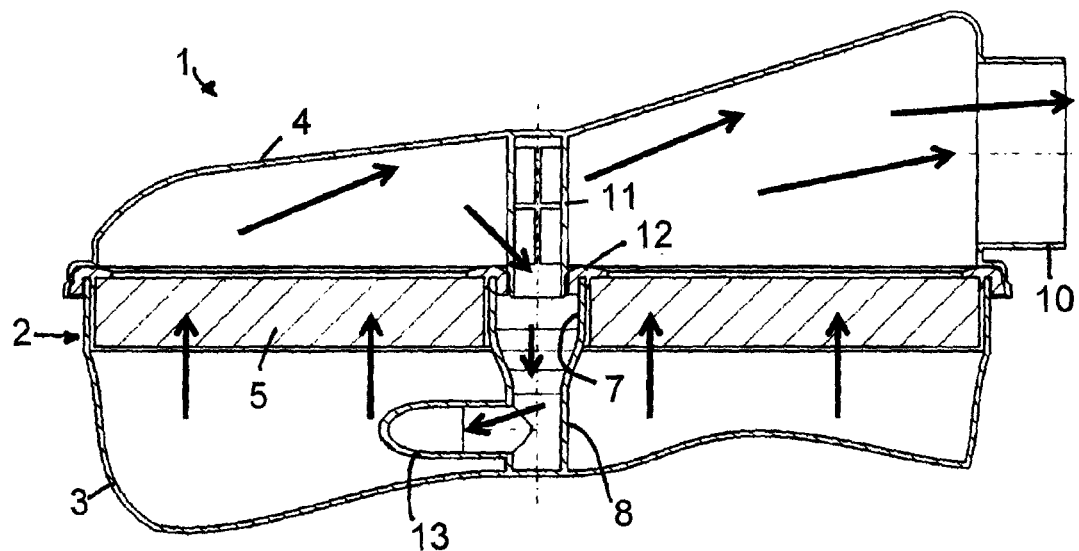
FIG. 6 shows the air filter according to FIGS. 4 and 5 in section.
Figure 7:
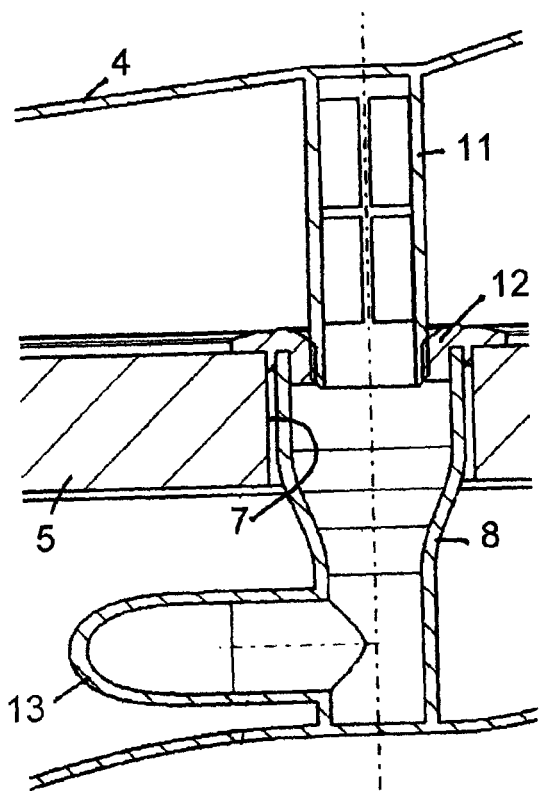
FIG. 7 is an enlarged illustration of the air filter according to FIG. 6 in the area of an outflow pipe that is passed through an opening in the filter element.

In FIGS. 4 to 7, a further embodiment of a filter device 1 embodied as an air filter is illustrated which has the same basic configuration as the first embodiment. In the filter device 1 according to FIGS. 4 to 7, there is also a plate-shaped or parallelepipedal filter element 5 arranged in a filter housing 2 comprising a housing base member 3 and a cover 4. In the lateral area of the cover 4, a housing-associated clean fluid outflow opening 10 is provided which is embodied as a socket and by means of which, as can be seen by the flow arrows according to FIG. 6, a first clean fluid partial flow is discharged. In the filter element 5, a central opening 7 is introduced into which an outflow pipe 8 is projecting which is formed monolithically with the housing base member 3 and on which a further clean fluid outflow opening is formed. In contrast to the first embodiment, however, the end face of the outflow pipe 8 which is facing away from the filter element 5 is embodied to be closed. The outflow pipe 8 is connected with a discharge pipe 13 which advantageously is formed monolithically with the outflow pipe 8 and is branching away from it. The discharge pipe 13 extends within the raw chamber. The open end face of the discharge pipe 13, as can be seen in FIG. 5, is designed as a socket and is extended to the sidewall of the housing base member 3. The open end face of the discharge pipe 13 that forms the second clean fluid outflow opening is located adjacent to the socket-shaped inflow opening 6 by means of which the raw fluid is introduced.

At the inner side of the cover 4 there is also a support part 11 which is cylindrical and designed as a support grid and projects into an annular sealing element 12 which is inserted in the area of the clean side into the opening 7 in the filter element 5. The sealing element 12 is supported by the end face of the support pipe 8. The support part 11 projects into the sealing element 12, and the end face of the support part 11 is exposed within the surrounding outflow pipe 8.

Figure 9:
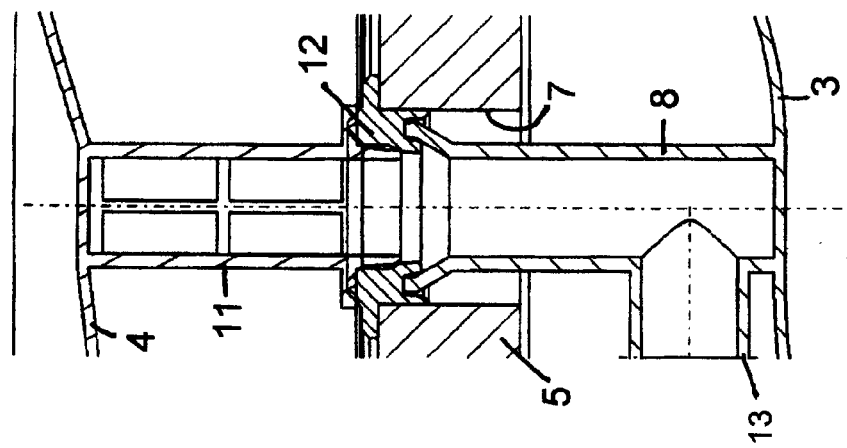
FIG. 9 shows the air filter of FIG. 8 in an enlarged illustration in the area of the outflow pipe that is passed through the opening in the filter element.
Figure 8:
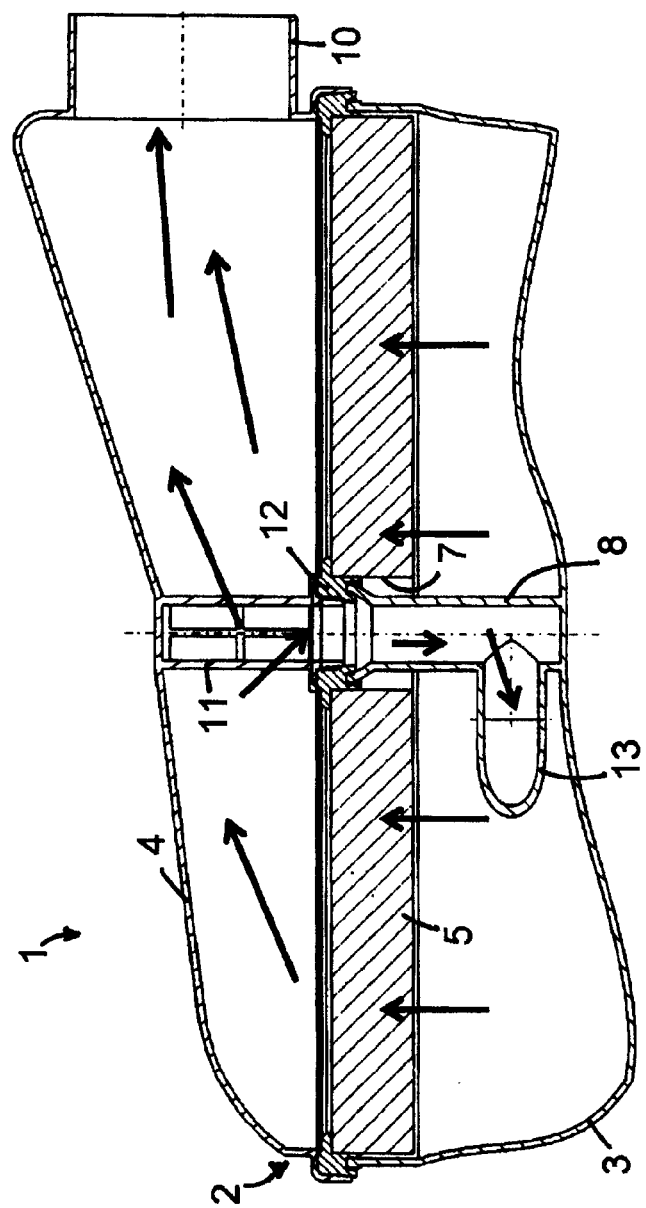
FIG. 8 shows an air filter in a further embodiment in section.

In FIGS. 8 and 9, a further embodiment with a filter device 1 embodied as an air filter is illustrated that corresponds substantially to the embodiment according to FIGS. 4 to 7. Different is however the embodiment in the area of the support part 11 and of the annular sealing element 12 that is inserted into the opening 7 in the filter element 5. According to FIGS. 8 and 9, a circumferentially extending, radially outwardly oriented shoulder provided on the support part 11 that is arranged adjacent to the end face is resting axially on the annular sealing element 12 that is inserted into the opening 7. The end face associated section of the support part 11 projects axially into the sealing element 12 that is supported axially on the opposite side by the end face of the outflow pipe 8.

While specific embodiments of the invention have been shown and described in detail to illustrate the inventive principles, it will be understood that the invention may be embodied otherwise without departing from such principles.

What is claimed is:

1. A filter device comprising:
    a filter housing having:
        a housing base;
        a housing cover received onto the housing base;
        wherein the housing base and cover define and enclose a chamber therein;
    a filter element that is plate-shaped and arranged within the chamber in the filter housing, the filter element having a filter medium comprising oppositely positioned lateral surfaces that form an inflow side for a fluid to be filtered and an outflow side for the clean fluid;
    a through opening extending completely through the filter medium from the inflow side to the outflow side;
    a first clean fluid outflow opening introduced into the filter housing and configured to discharge the clean fluid;
    an outflow pipe passing through the through opening of the filter element and configured to discharge the clean fluid through a second clean fluid outflow opening provided at the outflow pipe;
    wherein the first clean fluid outflow opening is separate from and spaced apart from the outflow pipe.

2. The filter device according to claim 1, wherein the first clean fluid outflow opening has a cross-sectional area that is greater than a cross-sectional area of the outflow pipe.

3. The filter device according to claim 1, further comprising
    an annular sealing element arranged on an outer circumference of the through opening where the through opening meets the filter medium, the annular sealing element having a flange portion projecting inwardly from the filter medium into an interior of the through opening;
    wherein the outflow pipe is resting directly on the annular sealing element.

4. The filter device according to claim 3, further comprising:
    a support part formed on an interior wall of the housing base or the housing cover and projecting inwardly towards the through opening of the filter element;
    wherein the outflow pipe is arranged directly on an interior wall of a different one of the housing base or the housing cover with respect to the support part;
    wherein the support part is supported on the filter element at the annular sealing element.

5. The filter device according to claim 4, wherein the support part contacts the annular sealing element on a first side of the annular sealing element that is opposite a second side of the annular sealing element,
    wherein the outflow pipe is resting on the second side.

6. The filter device according to claim 5, wherein the support part projects into the annular sealing element.

7. The filter device according to claim 5, wherein the support part has an end face and the end face is supported directly on the annular sealing element.

8. The filter device according to claim 4, wherein the support part is embodied as a support grid having flow openings for flow to enter the outflow pipe from the chamber.

9. The filter device according to claim 1, wherein the filter housing comprises a clean chamber that is facing the outflow side of the filter element, wherein the first clean fluid outflow opening is arranged in the clean chamber of the filter housing.

10. The filter device according to claim 1, wherein the cover is configured to be attached to the housing base member,
    wherein the first clean fluid outflow opening is introduced into the cover.

11. The filter device according to claim 1, wherein the first clean fluid outflow opening is introduced into a sidewall of a housing component of the filter housing.

12. The filter device according to claim 1, wherein the outflow pipe is embodied monolithically with either the housing base or the housing cover.

13. The filter device according to claim 1, wherein, via the first clean fluid outflow opening, primary air is supplied to an internal combustion engine and, via the outflow pipe, secondary air is supplied to an auxiliary device that is embodied separate from the internal combustion engine.

14. A filter element for a filter device according to claim 1, the filter element comprising:
    a filter medium having:

a first lateral surface forming an inflow side of the filter element;

a second lateral surface forming an outflow side of the filter element;

a through opening formed as a cutout extending completely through the filter medium from the inflow side to the outflow side;

an annular sealing element arranged on an outer circumference of the through opening where the through opening meets the filter medium, the annular sealing element having a flange portion projecting inwardly from the filter medium into an interior of the through opening.

15. The filter element according to claim 14, wherein the flange portion has a circumferential groove formed into the annular sealing element, wherein the circumferential groove is configured receive and engage an end portion of an outflow pipe.

\* \* \* \* \*